Jan. 17, 1956　　　C. BECKER　　　2,731,509
APPARATUS FOR SUPPRESSING GALLOPING CONDUCTORS
Filed April 21, 1951　　　4 Sheets-Sheet 1
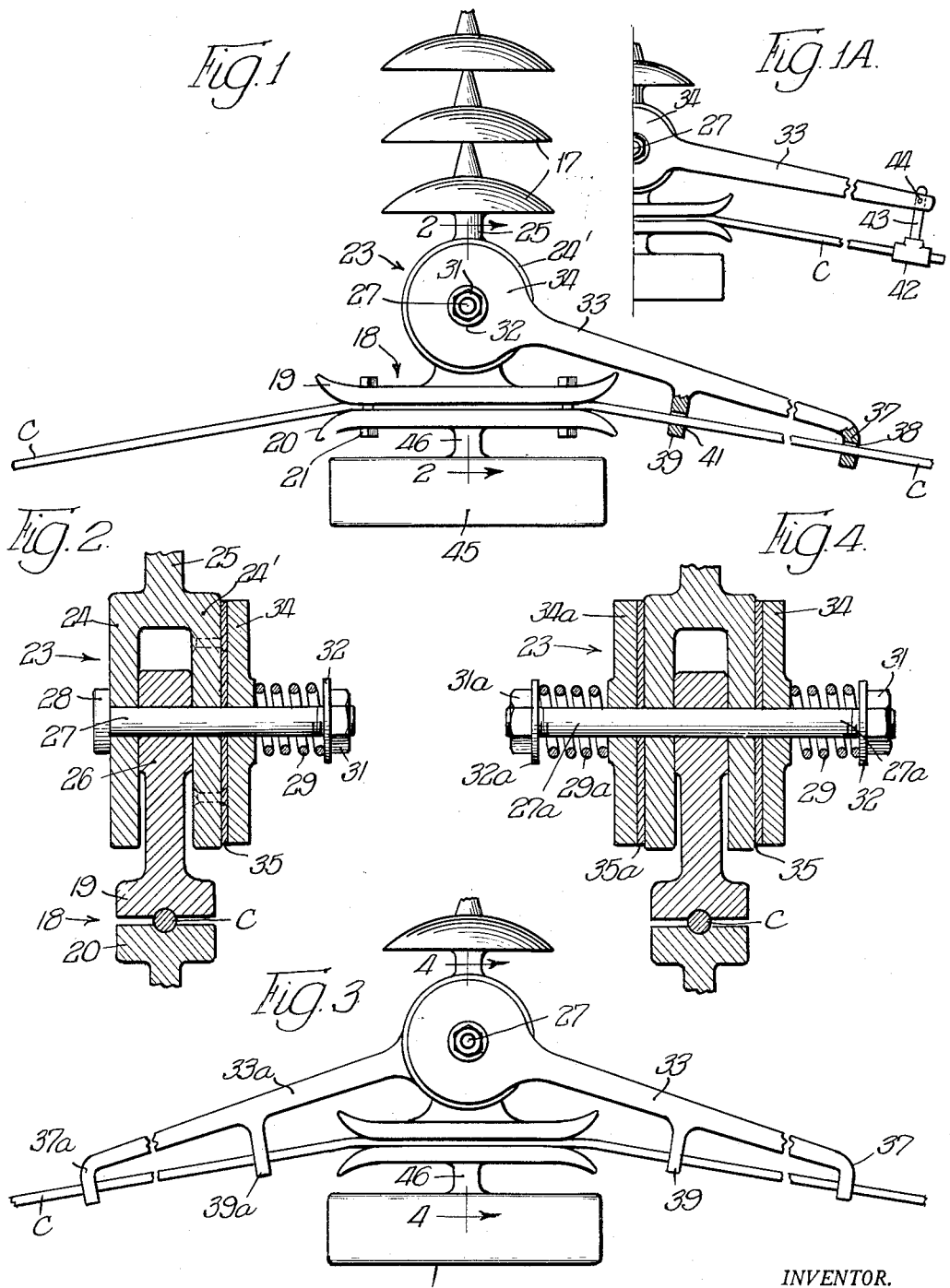
INVENTOR.
Carl Becker,
BY Brown, Jackson,
Boettcher & Dienner
Attys Jan. 17, 1956   C. BECKER   2,731,509
APPARATUS FOR SUPPRESSING GALLOPING CONDUCTORS
Filed April 21, 1951   4 Sheets-Sheet 2
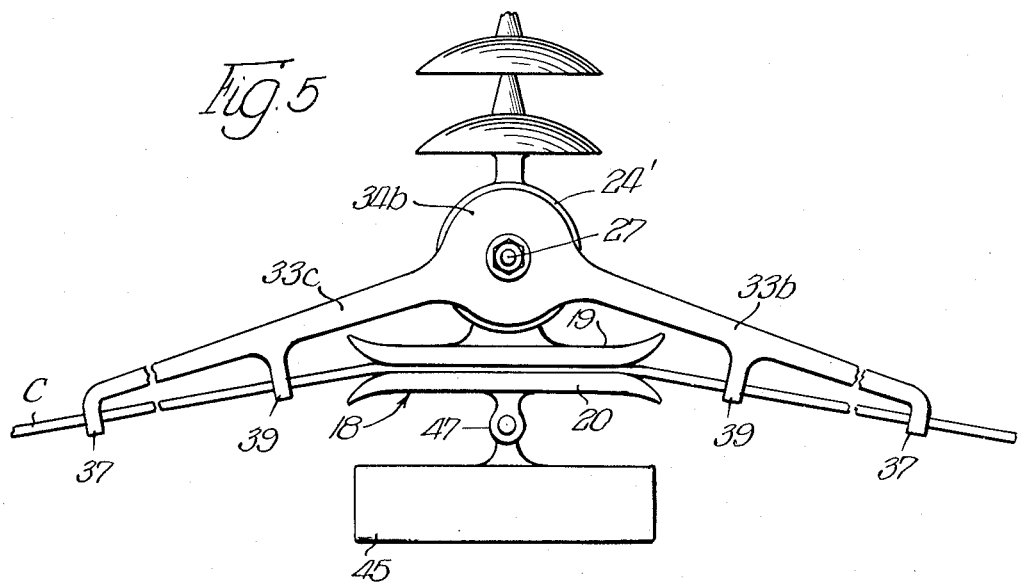
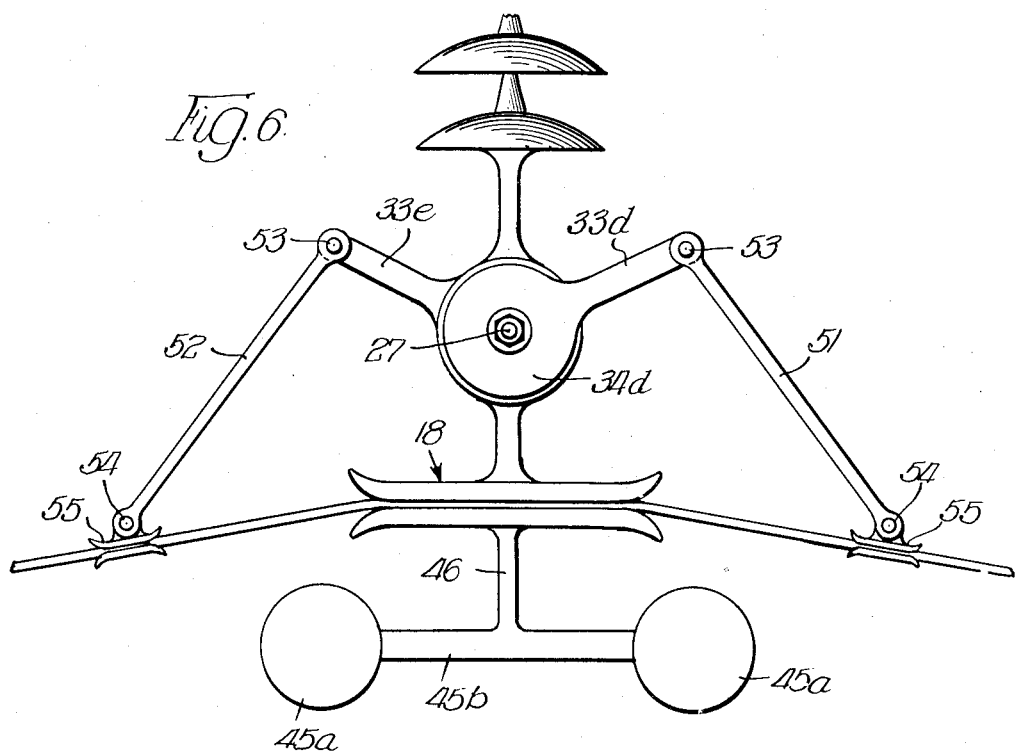
INVENTOR.
Carl Becker,
BY Brown, Jackson,
Boettcher + Dienner
ATTYS.

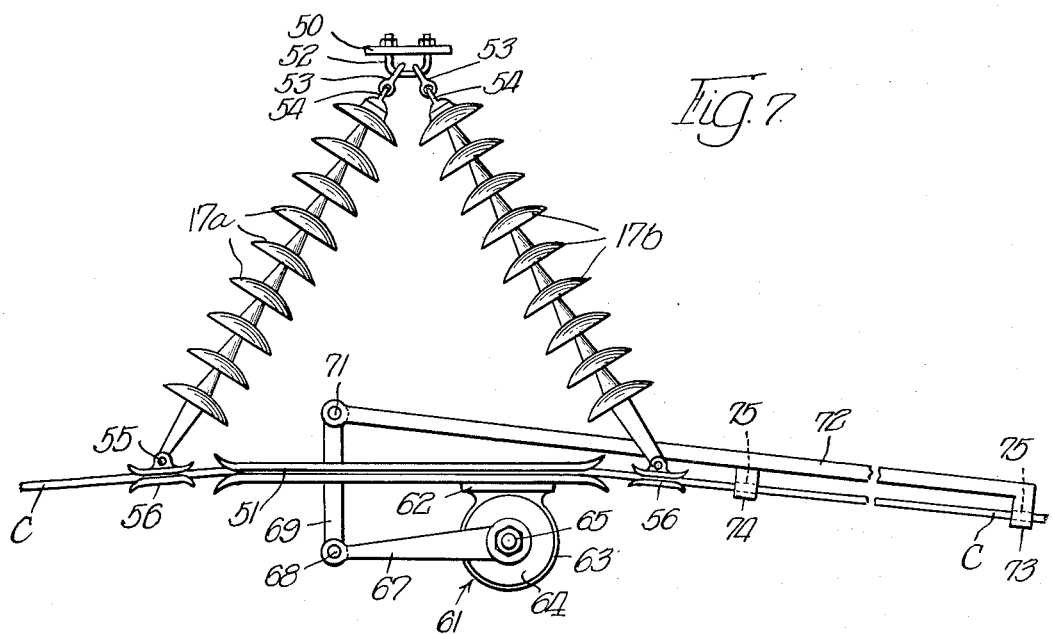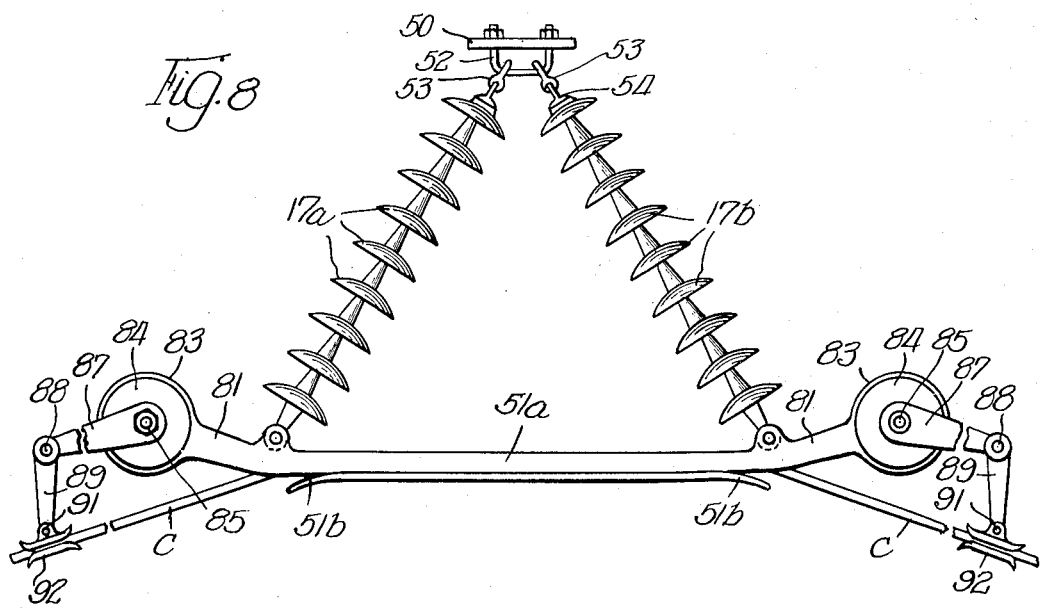

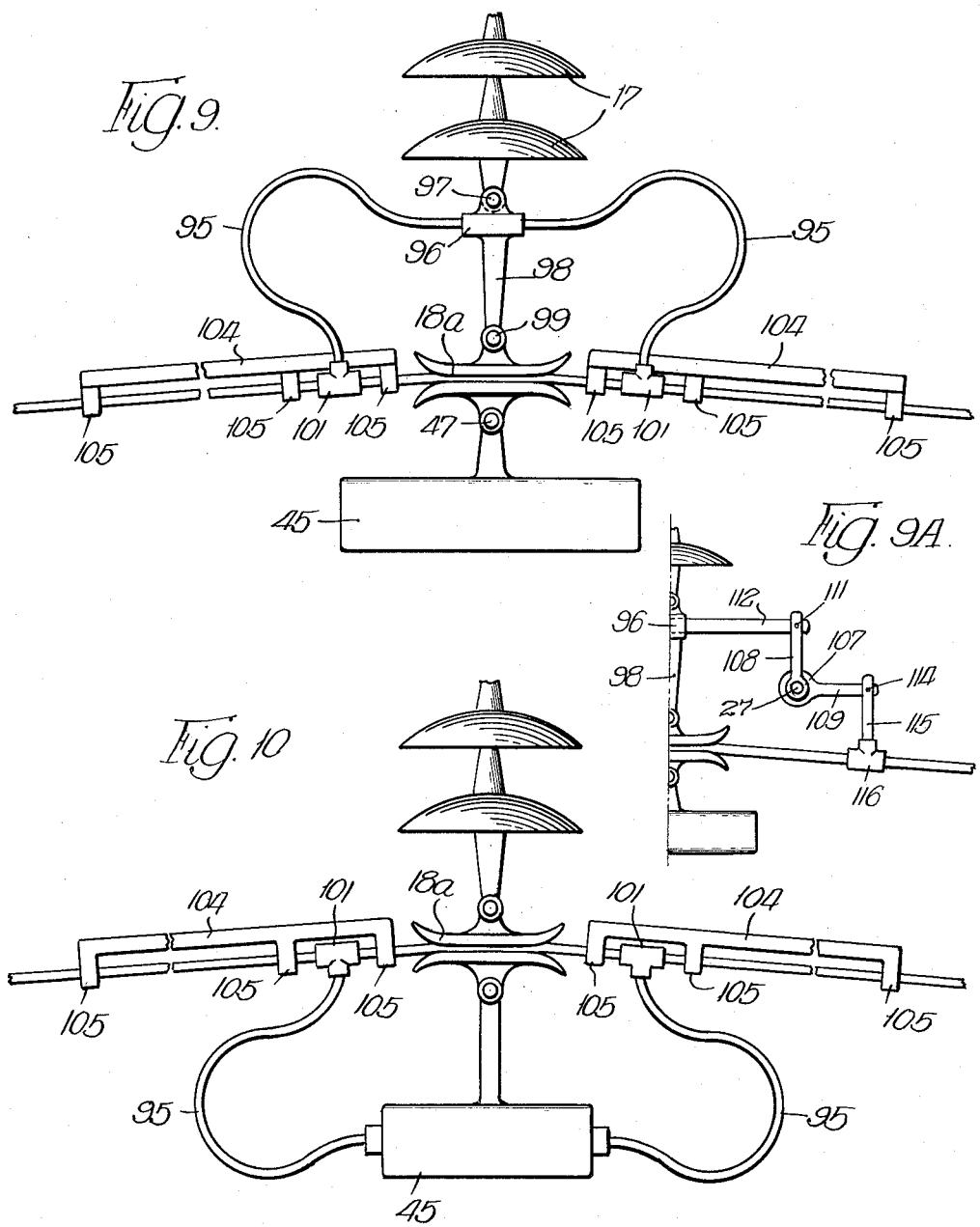

United States Patent Office 2,731,509
Patented Jan. 17, 1956

2,731,509

APPARATUS FOR SUPPRESSING GALLOPING CONDUCTORS

Carl Becker, Oak Park, Ill.

Application April 21, 1951, Serial No. 222,275

3 Claims. (Cl. 174—42)

The present invention relates to apparatus for suppressing or mitigating the large amplitude oscillations of aerial conductors called "galloping."

The present invention is related to the invention disclosed in copending application Serial No. 133,916, filed December 19, 1949, by myself and Earl L. Tornquist, also directed to apparatus for suppressing galloping conductors. The invention disclosed in the two applications are both directed to the same general problem of suppressing galloping oscillation in aerial conductors, but the apparatus of the present application represents a different approach to the problem.

Galloping oscillation in aerial conductors is wind-induced, but does not require high velocity winds because conductors have been known to gallop very vigorously under ordinary wind conditions. In the operation of an overhead electrical transmission and distribution system, galloping of conductors often results in considerable damage to the line and overhead structures. Violence of the galloping is often sufficient to cause contact between conductors, with resultant tripping out of the line, and in a general storm may constitute a serious threat to continuity of service. Because of its seriousness, this problem has prompted much study and research by the industry in the hope of finding a practical solution.

Although galloping is known to take place under widely different conditions, the published literature and many private reports indicate that in most of the cases which have affected operation of power lines, glaze or snow was present on the conductors. In many of these incidents, the glaze was approximately one-quarter of an inch or more thick at its thickest point, but in other cases, on conductors as large as one inch or so in diameter, it was only of the order of one-sixteenth inch, or even less. Moreover, there are reports of aerial conductors galloping where no glaze or snow was present. Here, the conductors ranged in size from No. 4 (0.204 inch diameter) bare, solid, copper wire to lead-sheathed telephone cables, 2.5 inches in diameter. It can be seen from these examples of galloping that the effect is produced under a variety of conditions. All forms of galloping, however, may be found to be susceptible to mitigation or alleviation by the same means.

The general object of the present invention is to provide improved apparatus for suppressing or mitigating such galloping oscillation of aerial conductors by exerting a damping restraint against relative displacement of the conductor span in a vertical plane. In this regard, it is a more specific object of the invention to provide improved apparatus of this general description which will be effective irrespective of different characteristic motions of the galloping oscillation. For example, the galloping oscillation may be in the form of two loops in each span of the conductor, and either with a stationary node or a node moving up and down. Also, the galloping oscillation may be in the form of one loop for each span, with adjacent spans substantially 180° out of phase (i. e. with adjacent spans moving up and down in opposite directions). Still further, the galloping may be in the form of two loops with adjacent spans either in phase or out of phase. The foregoing galloping motions are merely referred to for illustrative purposes, because, in fact, the galloping motions may assume an infinite variety of forms or configurations. My improved apparatus is effective to mitigate or damp all of these forms of galloping motion.

Another object of the invention is to provide improved apparatus of the above description which will be relatively inexpensive to construct and install. This cost of manufacture and installation is an important factor, because there would have to be a very large number of these restraining units on long transmission lines, there preferably being one of these units installed at approximately every pole or every other pole or tower.

Another object of the invention is to provide oscillation suppressing apparatus of this general description which will not impair or lessen the effective insulation of the conductor with respect to supporting cross-arms, adjacent conductors, etc. In high voltage transmission systems it is essential that the insulation value of the conductor by virtue of insulator supports, position of the conductor, etc. be not appreciably impaired by any oscillation damping apparatus.

Complete mitigation or 100% suppression of the wind-induced oscillations is not necessary for a satisfactory solution of the problem, and would probably be impossible to obtain in any suspended span. I have conducted extensive tests in the field which indicate that approximately 50% reduction in the amplitude of the galloping would provide contact-free operation during galloping. Also, with regard to the design and erection of new transmission lines, in which there has been an increasing tendency to provide sufficient separation between adjacent conductors, so that they cannot come into contact with each other during galloping, any material reduction in the amplitude of galloping would be reflected in a reduction in cost of the new construction. It should also be recognized in connection with partial mitigation that this will greatly reduce the damage to structures which in the past have suffered severely during periods of galloping. Evidence indicates that the damage done by a galloping of large amplitude is considerably greater than that caused by one of one-half that amplitude, and the extent of damage is greater than the ratio between these two figures. I have also observed in field tests on experimental lines that the residual galloping with the mitigating devices installed does not have the "snap" or "whip" that is present in the unmitigated galloping.

Other objects, features and advantages of the invention will appear from the following detail description of certain preferred embodiments of the invention. In the accompanying drawings illustrating such embodiments:

Figure 1 is a side elevational view of one embodiment of the invention in which a single energy absorbing pivoted arm is provided for connection to one span of the aerial conductor;

Figure 1A is a fragmentary elevational view of a modification of Figure 1;

Figure 2 is a transverse sectional view, on a larger scale, taken on the plane of the line 2—2 of Figure 1, and illustrating the pivotal mounting of this energy absorbing arm;

Figure 3 is a view similar to Figure 1 showing another embodiment employing two energy absorbing pivoted arms extending outwardly in opposite directions for opposite spans of the conductor, and capable of relative pivotal movement with respect to each other;

Figure 4 is a transverse sectional view on a larger scale taken approximately on the plane of the line 4—4 of Figure 3;

Figure 5 is a side elevational view showing another embodiment of the invention which also uses two oppositely extending energy absorbing arms, but in which the two arms are rigidly connected for pivoting movement as a unit;

Figure 6 is a side elevational view of another embodiment characterized by two independently movable energy absorbing arms, but in which the vibration or galloping motion of the conductor spans is transmitted to the arms through a system of pivoted links;

Figure 7 is a side elevational view of another embodiment employing a different type of mounting of the energy absorbing damping mechanism;

Figure 8 is a similar view showing another mounting of the energy absorbing damping mechanism operating on both spans;

Figure 9 is a side elevational view of still another embodiment wherein the energy absorbing damping action occurs as flexure of energy absorbing members;

Figure 9A is a fragmentary elevational view of a modification of the embodiment shown in Figure 9; and Figure 10 illustrates another modification of the embodiment shown in Figure 9.

In a typical high voltage transmission line, where my invention is of greatest utility, the conductors are suspended in long spans between supporting towers or poles, each tower usually having vertically spaced cross arms projecting outwardly from the sides thereof, and these cross arms having high voltage insulators 17 suspended therefrom, this being a conventional and well known practice. These suspension insulators 17 are connected together by articulating joints, as is well known, and the length of each string of insulators is dependent upon the voltage effective upon the conductor C. The string of insulators 17 is adapted to have supporting engagement with the conductor C through a conductor clamp 18 comprising upper and lower clamp sections 19 and 20 adapted to be secured over the conductor by bolts 21.

The conductor clamp is hung from the suspension insulators 17 through hanger means preferably in the form of pivoting mechanism, designated 23 in its entirety in Figures 2 and 4. This hanger or pivoting mechanism 23 comprises a downwardly facing clevis 24 formed integral with or secured to the lower end of a shank 25 extending downwardly from the lowermost insulator 17. A pivot eye or tongue 26 extends upwardly from the upper member 19 of the conductor clamp, into the space between the side arms of the clevis 24, where it is pivotally mounted upon a pivot bolt 27. If desired, the parts may be proportioned to have the conductor C and conductor clamp 18 straddled by the sides of the clevis 24, so as to decrease the vertical distance between the conductor C and the pivot bolt 27. A head 28 on one end of the pivot bolt 27 bears against the outer face of the clevis 24 at one side. At the other side, the bolt extends through and has a compression spring 29 mounted thereon, the pressure of which can be adjusted by screwing a nut 31 inwardly or outwardly along the bolt, a washer 32 being interposed between the nut and the spring 29.

The pressure of the spring 29 is employed to hold an oscillation damping arm 33 in energy absorbing frictional engagement with the hanger or pivot mechanism 23. This oscillation damping arm 33 is formed with a circular plate portion 34 at its inner end which is pivotally mounted upon the pivot bolt 27. The adjacent leg or side of the clevis 24 is also shaped in the form of a circular disk or plate 24' which substantially matches with the rotatable plate portion 34. Interposed between these two disk or plate portions 24' and 34 is a suitable friction facing material or energy absorbing material, designated 35. The arm 33 extends outwardly above one span of the conductor C. This portion of the arm 33 is preferably deflected laterally to lie directly above the conductor C, and at its outer end the arm is formed with a downturned guide portion 37 having an aperture 38 engaging over the conductor C. The length of the damping arm 33 out to the end guide 37 can be variously proportioned, depending upon the span of the conductor between points of insulator support, the diameter of the conductor, the characteristic of the energy absorbing material 35, and other factors. However, this arm should be of sufficient length so that if the amplitude of oscillation of the conductor span threatens to exceed a safe minimum, the span will transmit a sufficient degree of rotative movement to the oscillatable plate 34 to cause the material 35 to function effectively in its energy absorbing function. Solely as a rough approximation for certain typical conditions, this damping arm might range anywhere from 3 to 10 feet in length, or possibly longer. At one or more intermediate points along its length, the arm 33 may be provided with additional downwardly extending guide lugs 39 having apertures 41 engaging over the conductor. These apertures 38 and 41 may be split for convenient assembly over the conductor. They can be clamped to the conductor, or they may be guide apertures having a slip joint or free sliding fit over the conductor. If the latter arrangement is used, it may be advantageous to provide the conductor with a sleeve to protect it against wear.

In this regard, I also contemplate connecting the arm 33 to the conductor C in the manner shown in Figure 1A, using a clamp 42 secured fast to the conductor and provided with a bar or standard 43 pivotally connected to the arm 33 at 44.

The energy absorbing material 35 may assume any one of several forms, as described in detail in the aforementioned copending application of myself and Earl L. Tornquist, Ser. No. 133,916. For example, it may be composed of brake lining material, clutch facing material, powdered metal material, grindstone material, or the like, preferably being some material in which the frictional characteristics will not be adversely affected by rain, snow, ice, etc. The friction disk 35 is preferably riveted or otherwise secured to the stationary plate portion 24', although it will be understood that it might be secured to the relatively rotatable disk 34 if desired. The pressure of the spring 29 holds the friction disk pressed between the relatively rotatable disk and the stationary plate, and by adjusting the pressure of this spring any desired torque resisting moment can be given to the pivoted arm 33. In a modified embodiment of the invention, a non-corrosive disk may be interposed between the slipping surface of the friction disk 35 and the companion plate portion against which this slipping surface bears. This non-corrosive disk may be composed of rubber, rubber-like material, metallic alloy, composition, or other material of such nature that weather cannot cause a corrosive adhesion or cannot adversely affect the frictional characteristics between the two relatively rotatable disks, such as between the friction disk 35 and the outer rotatable plate portion 34 when the friction disk 35 is fastened to the plate portion 24'. In still another alternative arrangement, the energy absorbing material 35 may be designed to have the energy loss occur therein by flexure. For example, the disk might be composed of a flexible material having a high damping capacity, as specially compounded rubber, rubber-like material, or other material particularly compounded for that purpose, and would be of the necessary thickness to accommodate the required flexure. This flexible disk would then have its outer face cemented, vulvanized, or otherwise secured to the rotatable disk 34 and would have its inner face similarly secured to the mounting plate 24'. Thus, there would be no friction slippage in this latter construction, but all relative movement of the pivoted arm 33 with respect to the mounting plate portion 24' would be absorbed as flexure within the body of the flexible disk.

The energy absorbing response of the damping arm 33 to oscillatory or vibratory motion of the conductor C can be augmented, if desired, by providing a suspended weight 45 for insuring that a maximum amount of pivoting will occur at the pivot axis 27. This weight is preferably suspended below the conductor clamp 18 through a shank or link 46 extending between the lower clamp section 20 and the weight 45. As illustrated in later described embodiments, this connection between the weight 45 and the conductor clamp 18 may be a pivotal connection, if desired.

In the operation of this embodiment of the invention, it will be seen that all oscillatory or vibratory movement of the conductor occurring in a vertical plane will tend to oscillate the damping arm 33 around the pivot axis 27. This pivotal motion is highly damped by the energy absorbing materials 35 maintained under pressure by the spring 29. This damping action occurs constantly in response to both the upswing and the downswing of the conductor relatively to the point of support established by the suspension insulators 17. Thus, the arm 33 imposes a continuous damping restraint against vertical oscillations of the conductor, thereby tending to suppress or mitigate galloping and other wind induced oscillations occurring in the conductor in the vertical plane.

Attention is also directed to the fact that my improved construction has an energy absorbing damping action on any lengthwise swings which may occur along the length of the conductor C, either as a part of the galloping oscillations or possibly as an intermittent or independent movement. Such lengthwise oscillations or swings will result in a pivotal motion occurring at the pivot axis 27 between the line of the suspension insulators 17 and the line of the conductor clamp 18. In the normal, non-oscillating position of the parts the vertical line of the suspension insulators 17 lies at right angles to the horizontal line of the conductor clamp 18. In any substantial endwise oscillation of the conductor the line of the suspension insulators 17 is swung to an inclined position so that it assumes a different angle with respect to the line of the conductor clamp 18, such being permitted by the pivot axis 27 of the clevis mounting. By virtue of the fact that the damping arm 33 has its pivotal mounting on this same pivot axis 27, a change of angular position occurs between the damping disk 34 and the mounting disk 24'. This relative pivotal movement is resisted by the energy absorbing action of the friction disk 35 in the same manner previously described, from which it will be seen that my improved damping mechanism will also tend to damp lengthwise oscillations occurring in the conductor.

The damping arm 33 can be duplicated on the other side for damping the left hand span of the conductor, as illustrated in the modified construction shown in Figures 3 and 4. The same reference numerals, with the appendix *a* added thereto, designate the corresponding parts of this left hand damping mechanism. As shown in Figure 4, the arm 33a is formed with a disk or plate portion 34a which bears against the opposite side of the clevis 24 from the front plate portion 34. The pivot bolt, designated 27a, is extended entirely through the assembly to project from opposite sides thereof, this inner end of the bolt carrying an inner compression spring 29a which bears against the inner plate portion 34a of the damping arm 33a. In this modified construction, the two independently movable damping arms 33 and 33a both exert the same damping action upon vertical oscillations and lengthwise oscillations occurring in both the right hand span and the left hand span of the conductor, as described above in connection with Figures 1 and 2.

This dual construction using two damping arms 33 and 33a can also be used in the modified embodiment of Figure 1A.

In Figure 5 I have illustrated another modified embodiment in which right hand and left hand damping arms 33b and 33c respectively extend out along the right and left hand spans of the conductor C for imposing damping restraint thereon. In this latter embodiment, however, the two arms 33b and 33c are both joined together for unitary pivotal movement, such as by making them integral extensions of the rotatable friction disk 34b. This disk 34b is pivotally mounted upon a pivot bolt 27 and is spring pressed into frictional engagement with a friction disk 35, in the same manner described above in connection with Figures 1 and 2. In such construction the damping is effected by the energy absorption occurring at the friction disk 35 and also by the resistance which each span sets up in opposition to being oscillated by the other span. The pivoted arrangement of Figure 1A can also be used in the rigidly connected dual arm embodiment of Figure 5. In the embodiment of Figure 5 I have shown the weight 45 as being connected to the lower section of the conductor clamp 18 through a pivotal connection 47 which permits relative swinging movement between the weight and the conductor clamp in the lengthwise plane of the conductor. This pivoted connection 47 may be employed in lieu of the rigid connection 46 in the embodiments of Figures 1 and 3; and conversely, the rigid connection 46 may be employed in lieu of the pivot connection 47 in the embodiment shown in Figure 5.

In Figure 6 I have illustrated a further modification using right and left hand damping arms, but having these arms connected with their respective spans through inclined motion transmitting links 51 and 52. The upper ends of these links are pivotally connected at 53 with the outer ends of their respective damping arms 33d and 33e, and the lower ends of these links are pivotally connected at 54 with clamps 55 secured to the right and left hand spans of the conductor C. The two damping arms 33d and 33e are provided with separate damping plates or disks 34d and 34e which are spring pressed against friction disks 35, 35a mounted on opposite sides of the clevis 24, as typically illustrated by the construction shown in Figure 4. The normal angles of the damping arms 33d and 33e, and the length and inclination of the motion transmitting links 51 and 52 are so arranged and proportioned that vertical oscillations occurring in either span of the conductor are operative to transmit a maximum component of angular motion to the respective damping arm 33d or 33e. It will be understood that the constructions shown in Figures 5 and 6 both have the same pivoted clevis connection between the insulator string 17 and the conductor clamp 18, as heretofore described in connection with Figures 1 to 4, inclusive. As illustrative of the different forms that the weight 45 may take, in Figure 6 I have shown it in the approximate shape of a dumbbell having end spheres 45a connected by a cross bar 45b secured to a shank 46 extending downwardly from the lower half of the conductor clamp 18. This construction disposes more of the mass where it will have greater effectiveness for resisting angular displacement of the conductor clamp 18 and pivot axis 27.

In Figure 7 I have illustrated another construction in which two inclined strings of insulators 17a and 17b have their lower ends arranged to support a substantially horizontal cross beam 51 therebetween. The two inclined strings of insulators and the cross beam 51 produce in effect a suspended A-frame or triangularly shaped frame suspended at its apex from a cross arm 50 or like supporting structure extending out from the supporting tower. As illustrative of one typical or preferred form of suspension from the cross arm 50, a U-bolt 52 depending from the cross arm supports two tower type clevises 53 to which are pivoted angle tongues 54 anchored in the upper insulators of the string. The lower end of each inclined insulator string is pivotally connected at 55 to a clamp 56 which is fixedly clamped to the conductor C. In adapting the damping mechanism of Figure 7 to such an arrangement of inclined insulator strings 17a, 17b, it is only necessary to secure the beam 51 to that span of the conductor C lying between the two clamps 56. The beam 51 preferably comprises two split sections adapted to be clamped over the conductor and extending almost to the insulator clamps 56.

Suitably secured to the beam 51 is a damping mechanism 61 which may be of the friction type, hydraulic type or any other suitable type. One form of friction type is illustrated, this comprising a base 62 suitably secured to the cross beam 51, from which base extends a non-rotative friction plate 63. Cooperating therewith is a rotatable friction plate or disk 64 mounted on a pivot shaft 65 and pressed resiliently against the stationary plate 63 by a compression spring on this shaft, similar to the construction shown in Figures 2 and 4. A damping arm 67 extending from the rotatable plate 64 is pivotally connected at 68 to a link 69. This link in turn is pivotally connected at 71 to the inner end of a long damping arm or beam 72 which extends out along one span of the conductor C. Lugs 73 and 74 extend downwardly from the outer end and one or more intermediate points of the arm 72 and are fastened to the conductor. The arm 72 may be extended out any desired distance along the span of the conductor, depending upon the length of the conductor span, size of conductor, typical wind velocities occurring in that locality, etc. In a typical situation, the arm might extend out anywhere from three feet to ten feet along the conductor span, or possibly even further. It will be obvious that this arm 72 will partake of the vertical component of motion of the conductor in any galloping or other wind induced vibration of the conductor. This vertical component of motion will be transmitted through the link 69 to the reaction arm 67, where it will be opposed by the damping restraint of a damping mechanism 61. Thus, the galloping or other wind induced vibration will be very materially suppressed by the damping mechanism, whereby the possibility of damage to the line or adjacent structures is prevented or minimized. It will be seen that by virtue of the triangular formation of the frame 17a, 17b and cross beam 51, and the weight and tension of the conductor, this cross beam is supported in such manner that it serves as a very effective base or point of reaction against which the damping mechanism 61 can react when the vertical oscillations of the arm 72 transmit torque to the reaction arm 67. This same combination of damping mechanism 61, reaction arm 67, link 69 and damping arm 72 can be duplicated and extended in the other direction for suppressing galloping or other wind induced vibrations in the other span of the conductor extending to the left of the reaction beam 51.

In Figure 8 I have illustrated this same general arrangement of two inclined insulator strings 17a and 17b which have their lower ends connected to a slightly different form of cross beam 51a. The ends of this latter cross beam extend outwardly at 81 and carry relatively stationary friction plates 83. Cooperating therewith are rotatable friction plates 84 mounted upon pivot shafts 85. Compression springs may be mounted upon these shafts for resiliently holding the two friction faces in pressure engagement. Damping arms 87 extend from the rotatable friction plates 84 and are pivotally connected at 88 to links 89 which are pivotally connected in turn at 91 to clamps 92 suitably clamped to the conductor. Each damping arm 87 may extend out any desired distance along its respective span of the conductor, ranging possibly from three feet to ten feet, or may be even further. The conductor is suitably clamped or anchored in the cross beam 51a, such as by a clamping member or members 51b. The operation of this embodiment is quite similar to the operation of Figure 7, the beam structure 51a affording quite an effective reaction point against which the damping mechanisms can react in damping the oscillations of the conductor.

In Figure 9 I have illustrated still another embodiment of the invention wherein the damping effect is obtained by flexure of relatively stiff, bendable, energy absorbing members of high damping capacity. These are preferably in the form of sections 95 of lead pipe, lead-sheathed cable or other relatively non-resilient bendable material, bowed substantially as shown. The upper ends of these bendable sections 95 are anchored in a clamp or yoke cross bar 96 which hangs in suspension from the insulator string 17, preferably by a pivotal connection 97. Extending downwardly from the clamp or yoke 96 is a hanger portion 98 from which is suspended a suitable conductor clamp 18a, preferably through a pivotal connection 99. The lower ends of the bendable sections 95 are anchored in attachment clamps 101 which are fastened to the spans of the conductor at points spaced outwardly from the ends of the conductor clamp 18a. It will be apparent that during galloping oscillations of the conductor these bendable sections 95, 95 will function as oscillation dampers or energy absorbing devices through the relative displacements which occur between the substantially horizontal line extending through the conductor clamp 18a and attachment clamps 101 on the one hand, and the substantially vertical line extending through the conductor clamp 18, hanger 98 and insulator string 17 on the other hand. If desired, a weight 45 may be suspended from the conductor clamp 18a to accentuate these relative displacements. This weight 45 may have a rigid connection with the conductor clamp 18a, comparable to that shown in Figures 1 and 3, or it may have a pivotal connection with the conductor clamp at 47, comparable to the arrangement shown in Figure 5. As another optional addition, stiffening beams 104 may be secured to the right and left conductor spans by apertured lugs or by suitable clamps 105, so as to aid the damping effect by reaching out into the conductor spans to pick up galloping disturbances more effectively. These stiffening or damping arms 104 may reach out several feet along each span, comparable to the damping arms previously described.

In Figure 9A I have illustrated a modification of Figure 9 using a pivoted type of damping mechanism 107 instead of the bendable members 95 of Figure 9. This pivoted damping mechanism 107 may be of the frictional type, hydraulic type, or of other suitable pivoted construction, shown as comprising two articulated arms 108 and 109 pivoted together at 27, and having the damping mechanism effective to restrain relative articulation or pivoting between the arms. The one damping arm 108 is pivotally connected at 111 to a supporting bar 112 mounted in the socket 96 of hanger 98, and the other damping arm 109 is pivotally connected at 114 to the bar 115 extending upwardly from the clamp 116 secured fast to the span of the conductor C at one side. It will be understood that this same construction is duplicated at the other side for the next adjacent span of the conductor. The operation of this floating embodiment of pivoted damping mechanism 107 will be understood from the foregoing description.

In Figure 10 I have illustrated an inverted relation of the above described bendable members 95 having high damping capacity. In this inverted relation the bendable sections 95 have reaction ends anchored at points below the conductor clamp 18a, preferably to the ends of the weight 45 hanging below the conductor clamp. In this embodiment the weight 45 may have a pivotal connection or a rigid connection with the conductor clamp 18a, the latter probably being preferable in most instances. It will also be understood that the weight 45 shown in both Figures 9 and 10 may be of the dumbbell configuration shown in Figure 6, if desired.

The embodiment of Figure 9A can also be inverted for connection with the weight 45, corresponding to Figure 10.

While I have illustrated and described what I regard to be the preferred embodiments of my invention, nevertheless it will be understood that such are merely exemplary and that numerous modifications and rearrangements may be made therein without departing from the essence of the invention. In this regard, it will be understood that the energy absorbing damping action effective on the pivoted damping arms of any of the embodiments herein shown may, if desired, be obtained by flexure of a body of rubber or other energy absorbing material secured between the rotatable and stationary disks, as previously described in connection with Figures 1–4.

I claim:

1. In apparatus for suppressing wind-induced galloping oscillations in aerial conductors, the combination of spaced supporting structures, insulator strings hanging from said supporting structures, hanger means suspended from each of said insulator strings, and a conductor supported by said hanger means and extending in spans between said supporting structures, each of said hanger means comprising a downwardly facing clevis having laterally spaced side arms, a pivoting tongue extending into the space between said clevis side arms, a pivot bolt extending through said pivoting tongue and side arms and projecting outwardly from the outer sides of the latter, a conductor clamp carried by said pivoting tongue below said clevis and adapted to have clamping engagement over said conductor, a pair of damping arms pivotally mounted on said pivot bolt on opposite sides of said clevis for independent pivotal movement, said damping arms extending outwardly in opposite directions from said clevis, one arm above one span of said conductor extending in one direction from said conductor clamp, and the other damping arm above the other span of said conductor extending in the opposite direction from said clamp, apertured guide portions on the outer ends of said damping arms having free sliding fit over their respective spans of said conductor at points spaced substantial distances outwardly from said conductor clamp, whereby vertical galloping oscillation occurring in either span tends to cause vertical pivoting motion in its respective damping arm, a friction disk on the inner portion of each arm, a cooperating friction plate on each side arm of said clevis for cooperation with said friction disks, friction material between each friction disk and friction plate, compression springs mounted on the outer portions of said pivot bolt for pressing said friction disks of both arms inwardly against said friction material and friction plates, and a weight suspended below said conductor clamp and rigidly joined thereto for increasing the inertia of said hanger means and the point of reaction of said pivoted damping arms.

2. In apparatus for suppressing galloping oscillations in aerial conductors, the combination of spaced supporting structures, insulator strings hanging from said supporting structures, hanger means suspended from each of said insulator strings, a conductor supported by said hanger means and extending in spans between said spaced supporting structures, each of said hanger means comprising a clevis having laterally spaced side arms, a pivoting tongue extending into the space between said clevis side arms, a pivot bolt extending through said pivoting tongue and side arms, a conductor clamp carried by said pivoting tongue below said clevis and adapted to have clamping engagement over said conductor, a pair of damping arms pivotally mounted on said pivot bolt for independent pivotal movement, said damping arms extending outwardly in opposite directions from said clevis, one arm above one span of said conductor and the other arm above the opposite span of said conductor, means for operatively connecting the outer portion of each arm with its respective span at a point spaced substantially outwardly from said conductor clamp, whereby vertical galloping motion occurring in either span tends to cause vertical pivoting motion in its respective damping arm, a friction disk surface on the inner portion of each arm, a cooperating friction plate surface on said clevis for cooperation with each of said friction disk surfaces, spring means tending to hold said friction disk surfaces and said friction plate surfaces pressed together, and a weight suspended below said conductor clamp for increasing the inertia of said hanger means and said pivoted damping arms.

3. In apparatus of the class described for suppressing galloping oscillations in aerial conductors, the combination of spaced supporting structures, insulator strings hanging from said supporting structures, hanger means suspended from each of said insulator strings, a conductor supported by said hanger means and extending in spans between said supporting structures, each of said hanger means comprising a downwardly facing clevis having laterally spaced side arms, a pivoting tongue extending into the space between said clevis side arms, a clevis pivot extending between said side arms and said pivoting tongue, a conductor clamp carried by said pivoting tongue and adapted to have clamping engagement over said conductor, damping arm means pivotally mounted on said hanger means and extending outwardly therefrom along the line of said conductor, means operatively connecting said damping arm means with said conductor whereby vertical oscillation of said conductor causes pivoting motion of said damping arm means relatively to said hanger means, energy absorbing damping means effective between said hanger and said pivoted arm means for damping such pivoting motion of said damping arm means during vertical oscillation of said conductor tending toward galloping oscillation, and a weight suspended from said hanger means tending by its inertia effect on said hanger means to increase the amount of relative pivoting motion occurring between said damping arm means and said hanger means.

References Cited in the file of this patent

UNITED STATES PATENTS

| 430,690 | Robinson | June 24, 1890 |
| 803,589 | Hartford | Nov. 7, 1905 |
| 1,662,245 | Goodrich | Mar. 13, 1928 |
| 1,817,313 | Hofmann | Aug. 4, 1931 |
| 1,941,731 | Austin | Jan. 2, 1934 |
| 2,043,717 | Stickley | June 9, 1936 |
| 2,058,174 | Monroe | Oct. 20, 1936 |
| 2,065,336 | Langton | Dec. 22, 1936 |
| 2,263,728 | Gordon et al. | Nov. 25, 1941 |

FOREIGN PATENTS

| 503,929 | Germany | May 24, 1924 |
| 514,426 | Germany | Nov. 15, 1929 |
| 39,599 | France | Sept. 22, 1931 |
| 357,878 | Great Britain | Oct. 1, 1931 |